Aug. 5, 1924.
E. E. WICKERSHAM
TRACTOR CONSTRUCTION
Filed May 26, 1920
1,503,616
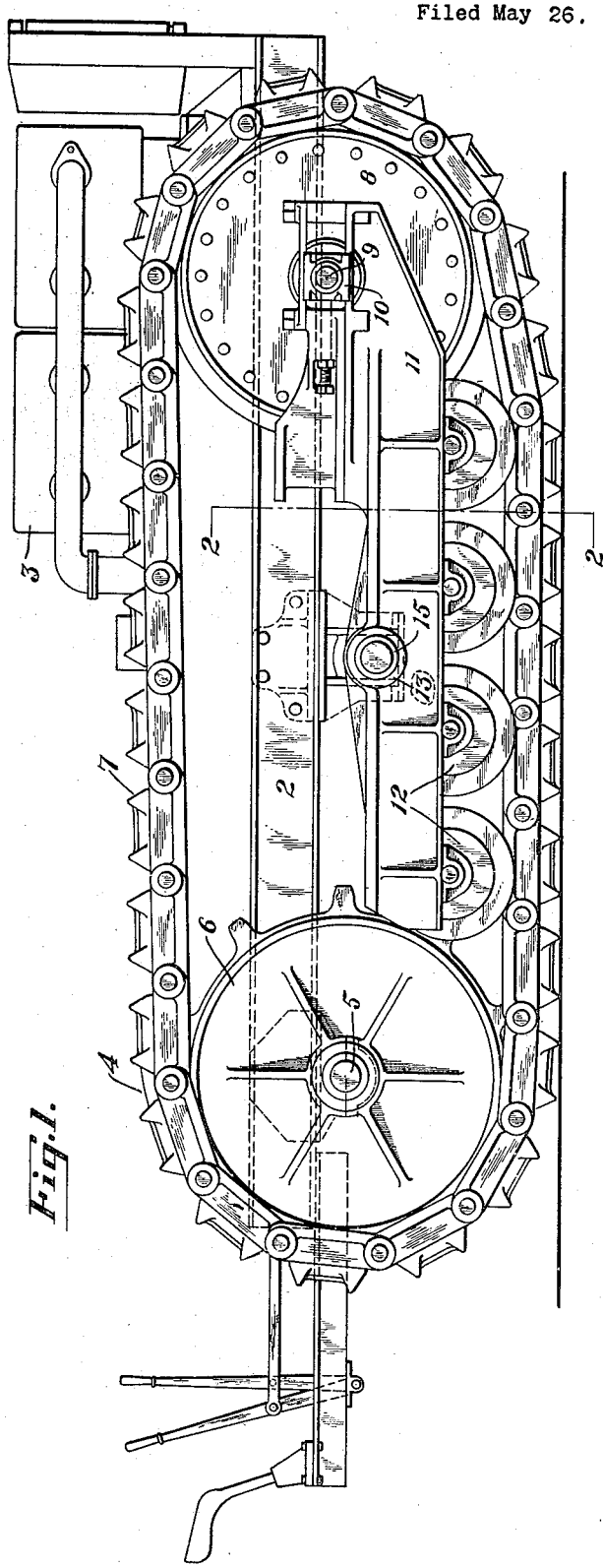
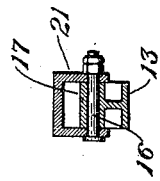
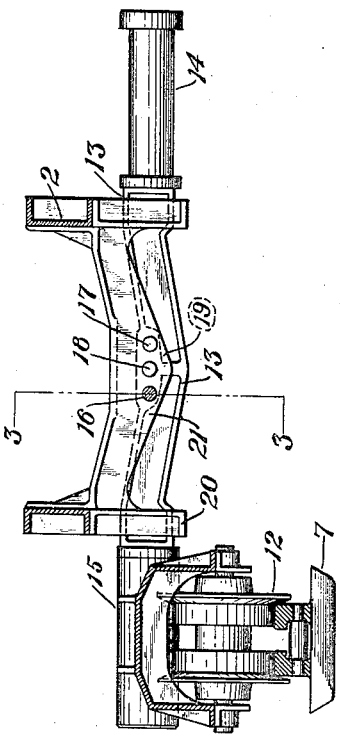
INVENTOR
Elmer E. Wickersham
BY
Chas E. Townsend.
ATTORNEY Patented Aug. 5, 1924.

1,503,616

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR CONSTRUCTION.

Application filed May 26, 1920. Serial No. 384,346.

*To all whom it may concern:*

Be it known that I, ELMER E. WICKERSHAM, a citizen of the United States, residing at Stockton, in the county of San Joaquin and State of California, have invented a new and useful Improvement in Tractor Constructions, of which the following is a specification.

This invention relates to vehicles and more particularly to tractors of the endless traction belt type.

It is one of the objects of the present invention to improve the suspension of tractors of the class having side traction devices on which the load of the main frame and the superstructure thereon is applied.

It is one of the objects of the invention to so improve the means for transmitting the load of the frame and superstructure to the traction devices as to eliminate certain structural elements common to vehicles of this type and to provide for the imposition of the load wholly through means of a rear axle and a front equalizer and further to provide for oscillation of the load bearing trucks connected to the equalizer.

A further object of the invention is to provide means for varying the pulling effort of the traction belts without varying the power transmitted to them by the power plant of the tractor and in this connection it is an object to provide means for varying the degree of weight imposed upon the respective traction belts to overcome any swinging tendency or tend to overcome it under different conditions of operation of the tractor.

Another object of the present invention is to provide means readily adjustable to connect the front axle and the main frame so as to vary the point of the application of the load of the frame on the equalizer and thereby to impose upon the respective traction belts different degrees of pressure and to increase or decrease their traction efforts.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Fig. 1 is a longitudinal elevation of the form of tractor incorporating the present improvement.

Fig. 2 is a transverse sectional view and partial elevation on line 2—2 of Fig. 1.

Fig. 3 is a detail transverse section through the organized axle and bolster structure taken on a line 3—3 of Fig. 2.

The present invention has in contemplation the construction of a tractor the parts of which can be readily adjusted so as to overcome or tend to overcome the tendency of the vehicle to swing from a given straight line during the operation of the vehicle from one or another cause as, for instance, when the vehicle is being utilized in plowing operation and when a plow or other drawn vehicle is attached to the tractor frame in such manner as to throw the line of draft off of the longitudinal center of the vehicle. When the line of draft is off the longitudinal center there is a tendency of the vehicle to swing or gradually travel off a given straight line. This results frequently when a tractor is utilized in pulling a plow that is attached to the tractor rather toward the furrow side of the vehicle one of whose traction belts may run close to the furrow. The uncounteracted swinging tendency results in the running of the vehicle into the furrow and plowed-up ground. This may be readily remedied if the pulling effort of the vehicle is so applied to the traction belt as to counteract the lateral swinging tendency.

The invention is incorporated in a tractor having a main frame 2 carrying the usual power plant 3 and transmission mechanism 4 the latter, in this case, being operatively connected to a rear axle shaft 5. This shaft has on its ends sprocket wheels 6, one being placed on each side of the main frame 2 and engaging respective endless traction belts 7; these being obviously of any suitable construction.

The forward ends of the traction belts are respectively mounted on idler wheels 8 having short trunnions 9 mounted in adjustable boxes 10 which are provided on the front end of respective wheeled trucks 11.

These trucks are disposed between the rear sprocket shaft 5 and the front idler wheels 8 and have rollers 12 running on the ground stretch of the belt.

One of the features of the present invention is the provision, in combination with the rear axle shaft 5, of a front equalizer to form the sole means of transmitting the load of the vehicle frame and the parts thereon to the traction belt through the medium of the rear wheels 6 and the trucks 11. Such a mode of application of the load therefore includes a front transverse equalizer 13 having journals 14 at its ends resting in boxes 15 provided on the respective trucks 11. Each truck is shown as comprising a substantially rigid and integral structure carrying a set of wheels 12 of suitable number and by journaling the axle 13 on the trucks 11 the latter can reciprocate or oscillate vertically at the sides of the main frame 2 as the vehicle passes over undulating surfaces or obstacles on a flat surface.

A further feature of the invention provides for the variations of the load of the vehecle frame on the axle 13 so that the tractive efficiency of the respective traction belts 7 may be changed according to the conditions of use of the vehicle or owing to any other factors which, during the operation of the vehicle, tend to cause the same to turn to one side or the other of a straight line of desired travel.

This variability of the load on the axle 13 is preferably secured through means adjustably connecting the equalizer and the vehicle frame at a given one of different transverse positions with respect to a line transverse to the frame and may readily be accomplished through means of a pivot pin 16 that is adjustable in one of the series of apertures 17 provided therefor in the intermediate portion of the equalizer 13 and which apertures are shown as alining with respective apertures 18 provided in a bolster or transverse portion 19 of the main frame. Obviously the equalizer 13 and the bolster 19 may be provided with other means for varying the point of connection between them and it is also understood that the equalizer and the bolster may be of any suitable construction desired or that expediency may require. In the present case the bolster 19 has a main body portion that is substantially channel shaped in cross section and the equalizer 13 is disposed between the flanges of the channel shaped body, the latter being of sufficient depth to provide for the vertical oscillation of the equalizer in accordance with the motion of the trucks and respective traction belts. The ends of the bolster 19 are preferably provided with downwardly extending brackets 20 forming guides for the side portions of the equalizer 13. The central portions of the flanges of the bolster 19 are deepened as at 21, where the apertures 18 occur, to provide the desired degree of strength and the intermediate portion of the equalizer 13 is also suitably reinforced and strengthened at the portion through which the apertures 17 pass.

One of the series of apertures in the axle and in the bolster is preferably arranged on the medial longitudinal line of the frame and when the pivot pin 16 is arranged in the central aperture it is obvious that the load applied on the equalizer is equally transmitted to its ends and to the trucks 11 and when power is applied to the driving means, as the wheels 6, the vehicle will be driven in a substantially straight course either forwardly or rearwardly. However, when it becomes necessary to use the vehicle in the drawing of an attached instrument as, for instance, a plow, and the connection of the latter is at a point to either side of the longitudinal medial axis of the frame then it is desirable to also adjust the point of application of the load of the vehicle frame on the equalizer 13 to compensate for the tendency of the vehicle to turn laterally from its course owing to the unequal pull to which it is subjected. In such case it is only necessary to remove the pivot pin 16 from the central aperture and arrange it in one or another of those on the side according to the line of draft between the draft and the drawn vehicle or other element to which the tractor is attached. As the load is thus increased on one of the traction belts its tractive efficiency is proportionately increased and the tractive effort of the other traction belt is as much decreased and therefore the more heavily laden traction belt will efficiently operate to keep the tractor headed up to a given straight line of travel.

It will be noted that the suspension for the main frame is at three points, two of which are formed by the sprocket wheels and the third by the equalizer bar which connects opposite load bearing truck members together. The load bearing truck members are free to rock individually about their pivotal connections with the equalizer bar and thus conform readily to the contour of the ground.

What I claim and desire to secure by Letters Patent is:

1. A tractor comprising a main frame, a track-laying truck mechanism at each side thereof, said truck mechanism including a truck frame, load-carrying rollers and an idler sprocket wheel mounted on said truck frame, an axle pivotally connected intermediate its ends to the main frame for rocking movement in a vertical plane, means for varying the point of connection between the axle and the main frame while leaving their relative positions unchanged, and a rotatable connection between each truck frame and the axle constituting the only connection between the truck frame and the main frame.

2. A tractor comprising a main frame, a track-laying truck mechanism at each side thereof, an equalizer bar connected to opposite truck mechanisms and pivotally connected intermediate its ends to the main frame, and means for varying the point of connection between said equalizer bar and the main frame while leaving their relative positions unchanged.

3. A tractor comprising a main frame, a track-laying mechanism at each side thereof, an axle pivotally connected intermediate its end to the main frame and connected to each truck mechanism in a manner to permit rocking movement of the latter in a vertical plane, and means for varying the point of connection between the axle and the main frame while leaving their relative positions unchanged.

4. A tractor comprising a main frame, a track-laying truck mechanism at each side thereof, a channel-shaped bolster extending beneath the main frame, an axle extending between the sides of said bolster and pivotally connected to the latter, said axle having its opposite ends pivotally connected to the truck mechanisms and means for varying the point of connection between the axle and bolster while leaving their relative positions unchanged.

In testimony whereof I have hereunto set my hand in the presence of two subscribing witnesses.

ELMER E. WICKERSHAM.

Witnesses:
 JOHN H. HERRING,
 W. W. HEALEY.